United States Patent [19]
Schmidt

[11] 3,945,555
[45] Mar. 23, 1976

[54] PRODUCTION OF BERYLLIUM REINFORCED COMPOSITE SOLID AND HOLLOW SHAFTING

[75] Inventor: Richard Schmidt, McLean, Va.

[73] Assignee: The United States of America as represented by the Secretary of the Navy, Washington, D.C.

[22] Filed: Mar. 17, 1975

[21] Appl. No.: 559,360

Related U.S. Application Data

[63] Continuation-in-part of Ser. No. 256,491, May 24, 1972, abandoned.

[52] U.S. Cl. ............... 228/126; 29/191.4; 164/108; 228/156
[51] Int. Cl.² .......................................... B23P 3/14
[58] Field of Search.................... 228/156, 126, 254; 29/196.2, 191.4, 191.6; 164/100, 108–110

[56] References Cited
UNITED STATES PATENTS

| | | | |
|---|---|---|---|
| 3,419,951 | 1/1969 | Carlson | 228/107 |
| 3,419,952 | 1/1969 | Carlson | 228/164 |
| 3,455,662 | 7/1969 | Alexander et al. | 29/191.4 |
| 3,505,039 | 4/1970 | Roberts et al. | 29/191.6 |
| 3,567,507 | 3/1971 | Yoblin | 29/191.4 |
| 3,609,855 | 10/1971 | Schmidt | 228/193 X |
| 3,667,108 | 6/1972 | Schmidt | 228/170 |

*Primary Examiner*—Ronald J. Shore
*Assistant Examiner*—Gus T. Hampilos
*Attorney, Agent, or Firm*—R. S. Sciascia; R. F. Beers; P. Schneider

[57] ABSTRACT

Manufacturing process for a solid or hollow shaft consisting of aluminum or titanium with beryllium reinforcing therein. Beryllium rods are either clad with aluminum or titanium or, in the alternative, holes are drilled in an aluminum or titanium block which beryllium material is thereafter inserted into the holes. The preform with a hard steel central mandrel around which the beryllium rods are positioned is placed within a steel can and heated to a predetermined temperature. Pressure is then uniformly applied to outer circumference of the can to ensure uniform deformation of the beryllium reinforcement. The uniform exterior pressure on the outer surfaces of the beryllium rods and the interior pressure on these rods caused by the hard steel mandrel against the under surfaces of the rods as a result of a reduction process causes the beryllium rods to assume an arcuate ribbon configuration. For hollow shafting, the mandrel at the center of the preform may later be removed.

5 Claims, 7 Drawing Figures

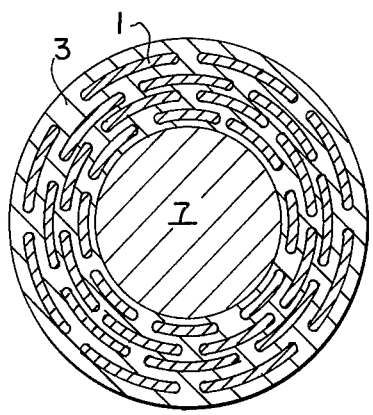
FIG. 5
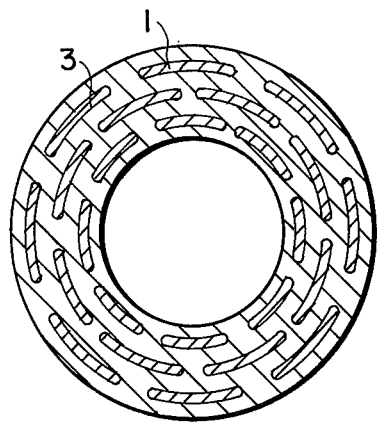
FIG. 6
FIG. 7
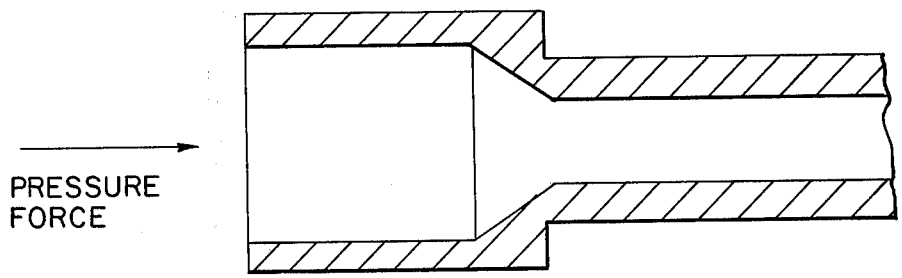
PRESSURE
FORCE

PRODUCTION OF BERYLLIUM REINFORCED COMPOSITE SOLID AND HOLLOW SHAFTING

The present application is a continuation-in-part of my previous application, Ser. No. 256,491, filed 5/24/1972, now abandoned.

BACKGROUND OF THE INVENTION

Shafts are probably one of the oldest structural elements known to man. They generally take the form of a long slender rod forming the body of a spear, the handle of a hammer, ax or golf club, and many other long implements. Modern aircraft use shafts to transmit motion, i.e. control rods. Most machinery use shafts to transmit motion in a push-pull or rotating action.

The major shortcoming of shafting used in advanced aircraft or high-speed rotating machinery is a low modulus of elasticity to density ratio (stiffness to weight). This poor stiffness to weight ratio requires the use of mid-support bearings or other mechanical devices which greatly increase weight, waste power and complicate design. One method of increasing the modulus and reducing the weight of a metal shaft is to reinforce it with a higher modulus and lower density material. Another characteristic necessary for the reinforcement is ductility sufficient for redistribution of stresses.

Many shafts are subject to impact loading, for example, connecting rods in a reciprocating engine, transmission shafts in a helicopter, and control rods in an aircraft. Previous work has proven that the metal beryllium used as reinforcement in a metal matrix composite in superior to all other plastic and metal matrix composites when subject to impact loads. The lack of ductility has proven to be a serious limitation in boron aluminum, boron epoxy and carbon epoxy type composites. In addition, the excellent elevated temperature ductility of beryllium allows fabrication procedures to be employed which could not be considered for less ductile composite systems.

Others have employed beryllium fiber, filaments and wires as reinforcing material. The diameter of this wire has not exceeded 0.01 inches and is quite costly to make, almost $4,000 per pound. In my previous U.S. Pat. Nos. 3,609,855 and 3,667,108, methods and techniques for the production of beryllium ribbon-reinforced composites and beryllium-titanium blading were disclosed. This invention is directed toward a different approach for fabricating the shafting identified in my previous patents. By utilizing larger diameter beryllium rods in the process of the invention the cost of the rods is reduced to $80 per pound.

SUMMARY OF THE INVENTION

There are several important considerations to be kept in mind when selecting a manufacturing process for a composite beryllium-aluminum or beryllium-titanium shaft. The important considerations are: (1) volume fraction of the beryllium reinforcement; (2) size and shaft of the reinforcement; (3) the mechanical properties of both the beryllium and the aluminum or titanium matrix after the fabrication of the shaft; and (4) the bond strength and degree of reaction (alloying) between the beryllium and the aluminum or titanium matrix. The present invention has been developed with these considerations in mind.

In accordance with an embodiment of the invention, the shaft results from cladding beryllium rods with aluminum or titanium and then bundling the rods to form a preform. The clad rods surround a harder central solid core such as steel which resists pressure to a far greater extent than the ductile beryllium and the surrounding aluminum or titanium and the preform is enclosed within a steel can. The entire preform is then heated and deformed by uniform application of pressure to the can.

In accordance with another embodiment of the invention, the beryllium rods are stuffed into drilled holes in an aluminum or titanium block and the foregoing manufacturing steps repeated.

OBJECTS OF THE INVENTION

An object of the present invention is to provide a method of manufacturing composite beryllium-aluminum or beryllium-titanium shafts of enhanced characteristics.

Another object is to provide a manufacturing process which produces a shaft with a relatively high modulus of elasticity to density ratio.

A further object of the invention is to manufacture a shaft which eliminates the need for mid-support bearings in advanced aircraft or high speed rotating machinery.

Other objects, advantages, and novel features of the present invention will become apparent from the following detailed description of the invention when considered in conjunction with the accompanying drawings.

BRIEF DESCRIPTION OF THE DRAWINGS

FIGS. 5 and 6 show an enlarged corss-section of a completed shaft with and without the core removed, respectively and with the surrounding steel can be removed from the shaft. The mandrel in FIG. 5 is shown enlarged relative to the same mandrel in FIGS. 1–4 in the interest of clarity of illustration although in practice the mandrel size would be the same; and FIG. 7 is a die casting arrangement which is exemplary of one possible method of deforming or compressing the preform.

DETAILED DESCRIPTION OF THE PREFERRED EMBODIMENTS

Figure 1:
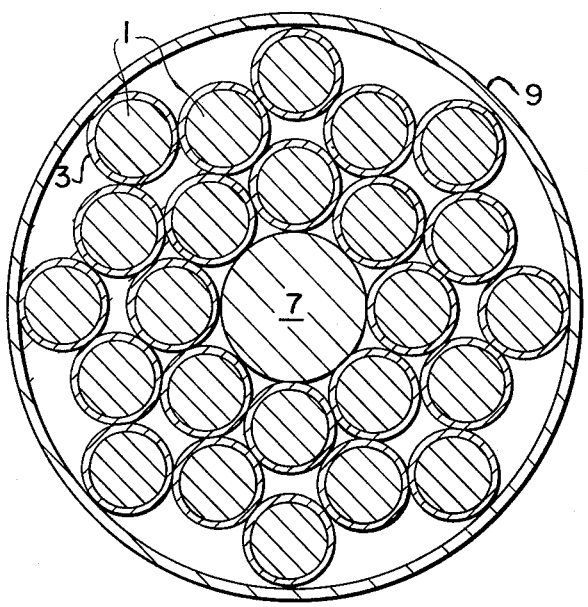
FIGS. 1 and 2 show in cross-section alternative embodiments of the initial form of the bundled preform of the invention.
Figure 2:
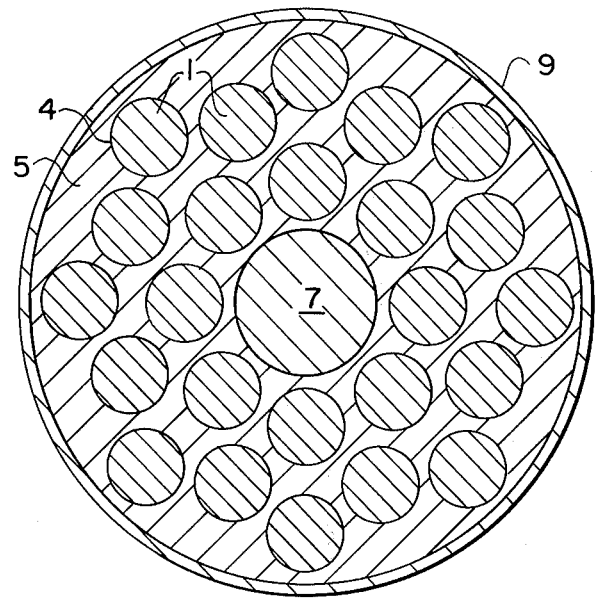

The first step of the process is indicated by either FIGS. 1 or 2. In both FIGS. 1 and 2, beryllium rods 1 having a diameter of ⅛ inch or greater, are used and may be formed by extrusion, drawing, swagging, rolling or machining from blocks. The beryllium rods 1 are then clad with aluminum or titanium 3. The cladding may be accomplished by many methods, such as slipping the rods 1 into tubing 3 (FIG. 1), stuffing the rods 1 into an aluminum or titanium block 5 drilled with evenly spaced holes 4 (FIG. 2), wrapping sheet or foil around the beryllium, or by vapor depositing or electroplating. Next, the clad beryllium rods are bundled into the configuration shown in FIGS. 1 and 2.

The volume fraction of the beryllium reinforcement is controlled by the thickness of the cladding as shown in FIG. 1 or by the spacing of the drilled holes as shown in FIG. 2. Thus the thickness of the cladding can vary as desired. The preform for the shafting should utilize a solid steel core or mandrel section 7 which is of harder material than the beryllium or aluminum or titanium, for example a solid steel core. The preform for hollow shafting can use a removable steel core mandrel 7 or a hard metal material which can be leached out later with a suitable acid in the manufacturing process. In either case the core section 7 has a diameter appreciably greater than any one of the beryllium clad rods.

After the bundle has been formed it is heated to a temperature for consolidation of the preform. Particularly in the case of an aluminum matrix, most of the deformation will occur in the aluminum, unless uniform hydrostatic pressures are maintained. Cladding the preform in a steel can 9 permits uniform circumferential application of the pressure. The steel can 9 will also prevent galling between the titanium and the steel die (FIG. 7) and is typically one-eighth of an inch thick.

Figure 3:
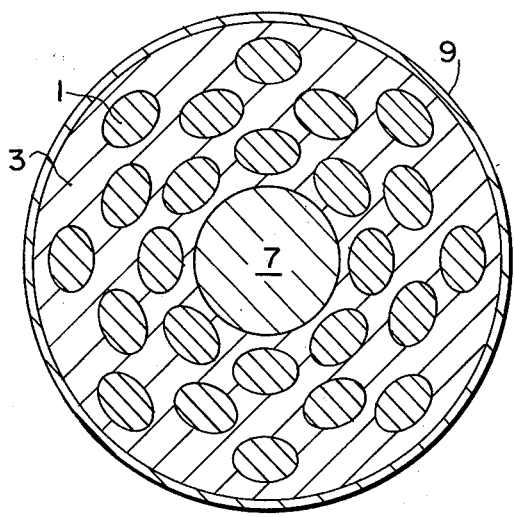
FIGS. 3 and 4 show a cross-section of the preforms of either FIGS. 1 or 2 at successive stages of the deformation.
Figure 4:
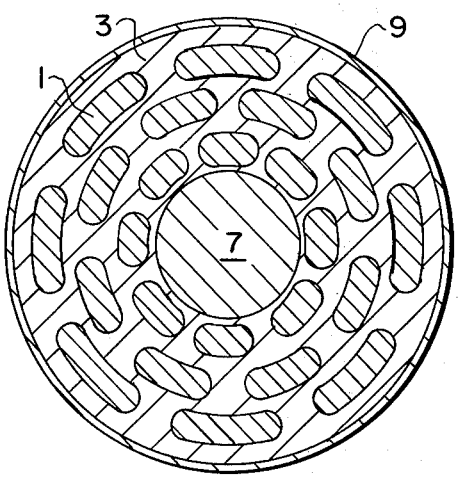

The size reduction of this preform to a shaft is accomplished by a series of controlled metallurgical deformation or compression processes. Reduction can be accomplished by extrusion, swagging, drawing or rolling. The important factor is to control the flow pattern of the beryllium. FIGS. 3, 4 and 5 illustrate the shaft at various points in this reduction process. It will be noted that the primary size reduction takes place by flatening of the beryllium rods. The steel core or hard mandrel does not deform appreciably at most, only insignificantly. The fact that beryllium is a ductile reinforcement enables one to form the composite into a complex shape either during the initial fabrication or after the composite shaft is made. It is only necessary to heat the composite to a temperature at which the shear strength of the matrix or reinforcement matrix bond is very low, permitting the reinforcement to bend and the matrix to flow around the reinforcement. Application of pressure on the outer surface steel can produces uniform exterior pressure on the outer surfaces of the clad beryllium rods while the hard round steel mandrel applies interior pressure against the inner surfaces the clad rods, causing them to assume the final arcuate shape shown in FIGS. 5 and 6. An arcuate ribbon-reinforced shaft as shown in FIGS. 5 and 6 has been found to be most efficient for this purpose. The final shape of the reinforcement will depend on the initial shape of the reinforcement and the direction and amount of deformation. However, the arcuate ribbon-shaped reinforcement shown in FIGS. 5 and 6 is highly desirable.

The shaft of FIG. 5 represents the finished product when it is desired to retain the core 7 as part of the finished shaft. Hollow shafting as shown in FIG. 6 may be formed over a removable mandrel as in conventional drawing or swagging operations. In the alternative, the solid center can be formed of suitable material which leached out with a suitable acid. The steel can 9 is shown removed in FIGS. 5 and 6 and this may be accomplished by sliting the can and peeling it off or by inserting the preform in an acid bath to etch off the can.

For a typical shaft forming operation, the volume fraction of the beryllium reinforcement should be between 25 and 85 percent. Less than 25 percent would not give sufficient reinforcement and over 85 percent would result in a brittle composite shaft. A good balance between stiffness and toughness would be about 50 percent. For optimum strength and fracture toughness, the resultant size of the beryllium reinforcement should be as small as economically practical. A good rule of thumb is to provide a minimum of three layers of reinforcement for good impact resistance. The fabrication temperature for aluminum should be between 600° to 800°F. and 1200° to 1400°F. for titanium to minimize the loss in strength of the beryllium and the reaction between the beryllium and the matrix.

Size reduction of the preform can be accomplished by a number of methods, one of which is the die forming method of FIG. 7 with the preform being forced in the direction indicated. Two or more dies of progressively diminishing size such as shown in FIG. 7 may be used successively to obtain the desired diameter shaft, depending on the pressure utilized to force the preform through the dies. In actual practice, the preforms of FIGS. 3, 4, 5 and 6, shown in the various stages of the process, progressively diminish in size from that shown in FIG. 1. This can be done by forcing the preform through a series of successively smaller dies. For example, a 3 inch diameter preform such as shown in FIGS. 1 and 2 may result in a ½ inch diameter shaft of FIG. 5; a 3 ½ to 4 inch diameter preform may result in a 1 inch diameter shaft of FIG. 6 having a ½ inch diameter mandrel removed. The amount of deformation of the preform depends on the final geometry required of the shaft and the stresses or pressures applied to the preform in its various stages of deformation.

Obviously many modifications and variations of the present invention are possible in light of the above teachings. It is therefore to be understood that, within the scope of the appended claims, the invention may be practiced otherwise than as specifically described.

What is claimed is:

1. A method of forming a shaft comprising:
   forming beryllium rods;
   cladding the beryllium rods with a metal selected from the group consisting of aluminum and titanium;
   arranging the clad beryllium rods around a hard central mandrel selected from a material which resists deformation to a far greater degree extent than said clad rods at a given temperature and which has a diameter appreciably greater than the diameter of each of said rods and into a configuration having a substantially circular cross-section to make a preform;
   enclosing the preform within a cylindrical steel can;
   heating and reducing the preform including converting the beryllium rods under pressure into arcuate ribbons spaced from each other and from other arcuate ribbons to form a composite shaft; and
   removing the shaft from the steel can.

2. The method of claim 1 wherein the clad beryllium rods are arranged so that their axes define a plurality of spaced concentric cylinders surrounding the central mandrel, and includes the step of removing the mandrel after said rods have been converted into said arcuate ribbons.

3. The method of claim 1 wherein the volume fraction of beryllium in the completed shaft is between 25 and 85 percent.

4. A method of forming a shaft comprising:
   cladding beryllium rods with a metal selected from the group consisting of aluminum and titanium;
   bundling the clad beryllium rods around a central mandrel selected from a material which is harder than said clad rods and which has a diameter greater than the diameters of said rods so that the beryllium rods define a plurality of concentric cylinders surrounding the central mandrel;

enclosing the preform within a cylindrical can such that spaces devoid of material exist between adjacent rods;

heating, and then reducing the preform under pressure to form a composite shaft; whereby the clad material flows and occupies said spaces and the beryllium rods are converted into arcuate ribbons, said arcuate ribbons arranged to define a plurality of concentric cylinders surrounding the central mandrel; and removing the shaft from the can.

5. A method of forming a shaft comprising:

surrounding a hard core mandrel with concentrically arranged circles of smaller diameter beryllium rods which are spaced from one another by a metal selected from the group consisting of aluminum and titanium to make a preform;

enclosing the preform within a cylindrical steel can;

heating the preform with its surrounding can to a temperature between 600° to 800°F. for the aluminum and 1200° to 1400°F. for the titanium, and simultaneously with the foregoing step reducing the preform under uniform pressure applied to the exterior surface of said steel can to thereby convert the beryllium rods into arcuate-shaped ribbons arranged in circles around the hard core mandrel.

* * * * *